United States Patent Office 3,441,548
Patented Apr. 29, 1969

3,441,548
COMPOSITIONS OF AMMONIUM SALT OF WEAK ACIDS AND ALKALINE-EARTH METAL OXIDES USEFUL FOR VULCANIZING HALOGEN-CONTAINING ELASTOMERS
Jack Horstmann Thelin, Somerville, N.J., assignor to American Cyanamid Company, Stamford, Conn., a corporation of Maine
No Drawing. Filed June 25, 1964, Ser. No. 378,053
Int. Cl. C08f 27/06, 45/72
U.S. Cl. 260—86.1   10 Claims

ABSTRACT OF THE DISCLOSURE

A process for curing a reactive halogen-containing elastomer which comprises mixing the said elastomer with an ammonium salt of a weak acid and an alkaline-earth metal oxide and heating the resulting mixture.

This invention relates to a new and improved process for the vulcanization of elastomers containing reactive halogen atoms. More particularly, it relates to a process for curing elastomers containing reactive halogens by use of a novel combination of ammonium salts of weak acids and oxides of the alkaline-earth metals. It relates further to the vulcanizable and vulcanized elastomeric products resulting from the practice of said process.

Halogen-containing elastomers with which the present invention is concerned are of several different commercially available types. Chlorine is the most commonly active halogen and will be used in this discussion as illustrative.

One class of such elastomers includes copolymers which comprise, in major proportion, a polymerized lower alkyl acrylate and, in minor proportion, a copolymerized monomer containing the active halogen. To designate such polymers herein, the term "acrylate elastomers" will be used.

Another class of active halogen-containing elastomers which may be cured in accordance with the present invention is often referred to as "polychloroprenes." As used herein, the term "polychloroprene" includes not only polymers of "chloroprene" (2-chloro-1,3-butadiene), but also copolymers thereof with polymerizable vinyl or diene compounds wherein chloroprene is the predominant monomer.

Still further types of active chlorine-containing elastomers which may be cured in the vulcanization process of this invention include, for example, chlorinated butyl rubber; and polymers of chloro-sulfonated polyethylene.

Such elastomers are of particular interest because of their outstanding resistance to deterioration due to heat. They perhaps have the best such properties of all commercial rubbers, except for some silicones and some highly fluorinated elastomers made for special applications. They also are highly resistant to flexural breakdown, compression set, ozone, ultraviolet light, mineral oils and gas diffusion. They have been recommended for, and widely used in gaskets, hose, conveyor belts, valve seats, packings, oil seals, printing rolls, protective coatings, transformer leads, electrical insulation and the like.

Polymers which contain reactive halogens present entirely different curing problems than other polymers, because the halogen groups have a speeding-up influence on vulcanization if a conventional cross-linking agent is used. They thus should be generally cured with different recipes than are in use for other types of elastomers. Various agents have been used in this connection. Among the curing agents which have been suggested are ammonia and various primary and secondary amines.

Unfortunately, for most purposes, ammonia and amines are too fast-reacting as curing agents, causing premature curing and scorching. This is particularly true of the newer elastomeric copolymers of ethyl acrylate and vinyl chloroacetate since the elastomers are largely used for making molded articles and it is highly important that they be capable of flow into a hot mold without premature curing. Moreover, it is also important that the curing agents be usable by conventional techniques to give vulcanizates which satisfy all the standard requirements for commercial elastomers.

It is, therefore, one major object of the present invention to provide a curing agent for "acrylate" and "non-acrylate," halogen-containing elastomers which will permit:

(1) good shelf life of the compounded stock;
(2) good flow of elastomer into the hot mold, prior to curing;
(3) adequate short curing cycles;
(4) the use both of medium and high curing temperatures; and
(5) cured elastomers of good appearance and physical properties.

This and other objects have been accomplished by the present invention by using certain ammonium salts in combination with oxides of the alkaline-earth metals as curing agents.

In contrast with the use of some previously proposed curing agents which permitted the user only a limited time to compound the elastomer before scorching occurred, use of the novel combination of ammonium salts and alkaline-earth metal oxides of this invention allows ample processing time. At temperatures below curing temperature ranges, the agents are stable and permit processing safety. The compounded elastomers are readily flowed into the mold before curing occurs. However, at the temperatures ordinarily used for curing (usually above 150° C.), the ammonium salt-alkaline earth metal oxide combination of this invention does produce rapid curing. The resultant shortened vulcanization times enable a manufacturer to produce more finished articles per unit of available machine time and thereby reduce his operating costs.

A further advantage of the present invention is in the utilization of readily available ammonium salts of weak acids. Useful salts include, for example, ammonium acetate, ammonium carbonate, ammonium benzoate, ammonium propionate, ammonium stearate, ammonium vanadate, ammonium terephthalate and the like. It will be noted that salts of inorganic and organic acids, including both mono- and poly-basic acids, are contemplated. They may be salts of almost any acid having a pKa value of above about three and, preferably, above about four. Mixtures of salts also may be used.

The alkaline-earth metal oxides useful in accordance with this invention, namely barium oxide, calcium oxide and strontium oxide, are not only good acid acceptors, but in combination with the ammonium salts, they also provide cured elastomers having low compression-set values, and they promote a harder and faster cure.

The recommended amount of ammonium salt is between about 1 and 20 weight parts, preferably between about 2 and 10 parts, per 100 parts of elastomer.

The recommended amount of alkaline-earth metal oxide is within the range of between 0.1 part and 10 weight parts, preferably between 0.2 part and 6 parts, per 100 parts of elastomer. It is desirable to have an excess by weight of ammonium salt over alkaline-earth metal oxide.

Standard compounding procedures are used for incorporating the ammonium salt, oxide and other compounding ingredients into the elastomer. In general, curing temperatures above 150° C. are recommended. Otherwise, no changes in the known curing practice are required.

This invention does not reside in the mere finding that an acid-accepting substance should be used in the curing recipe. It has been common practice in the trade to add an acid-acceptor to compounded elastomer stock for the purpose of reducing corrosion of the molds in which the elastomer is cured. Magnesium oxide is the most commonly used material. It is generally satisfactory for use with an ammonium curing system. In this case, magnesium oxide, although not unacceptable as an acid-acceptor, leaves much to be desired since it gives lower hardness, lower modulus and higher compression set values compared to alkaline earth oxides.

As compared with magnesium oxide, the alkaline-earth metal oxides provide greatly improved compression-set properties, a tighter cure, as indicated by the 100% modulus values, and increased hardness. It should be noted that equimolecular amounts of other barium compounds, such as barium chloride, barium acetate and barium nitrate, also do not provide the very low compression sets and tight cures that are obtained with the corresponding oxide. Low compression set is an important attribute of cured elastomeric materials. This is particularly true for molded objects such as gaskets. The concept "compression set" is a measurement of compression elasticity, or the ability of a compressed rubbery article to return to its original shape and dimensions, when the force causing the compression is removed. Compression set is expressed as percent deformation remaining when the compressing force is removed from the compressed article. Low values are therefore the most desirable ones.

The present invention will be further illustrated in the following examples. Therein, unless otherwise noted, all parts and percentages are by weight and all temperatures are in degrees centigrade.

Example 1.—Comparison of oxides on equimolar basis

Five masterbatches were prepared, each containing 100 parts of 97.5/2.5 ethyl acrylate/vinyl chloroacetate elastomer, 50 parts of SRF (Semi-Reinforcing Furnace) carbon black and 2 parts of stearic acid. Each masterbatch was milled on a rubber-mill with 3 parts of ammonium benzoate and the amount and kind of oxide shown below in Table I. The elastomer mixes were cured in molds under pressure at a temperature of 165° C. for 8 minutes. The cured elastomers were then conditioned at 150° C. for 24 hours. The physical properties of the vulcanizates were determined.

The compression set of the vulcanized rubber is measured by the procedure of ASTM Designation D395–53T using a 30% compression for 70 hours at 150° C. In Table I, the compression set is the amount in percent by which the test piece failed to return to its original thickness when the compressive load was removed.

TABLE I

| Amount of oxide based on elastomer [1] | 100% modulus, p.s.i. | Tensile strength, p.s.i. | Elongation, percent | Compression set, percent | Hardness, Shore A |
|---|---|---|---|---|---|
| 1.0% MgO | 525 | 1,625 | 280 | 71.2 | 62 |
| 3.8 BaO | 1,300 | 1,575 | 100 | 17.2 | 71 |
| 1.4% CaO | 875 | 1,550 | 150 | 33.3 | 67 |

[1] All oxides are molar equivalents of each other.

These results show the greatly improved compression set, the tighter cure and the increased hardness of the cured elastomer, that are obtainable by replacing the magnesium oxide with equimolecular amounts of barium or calcium oxides.

Example 2.—Comparison of magnesium oxide and barium oxide at equal weights and the effect of increasing amounts of barium oxide Six masterbatches were prepared as in Example 1. Each masterbatch was milled with 3.0 parts of ammonium benzoate and the amount of magnesium oxide or barium oxide shown in Table II. The elastomeric mixes were cured in molds under pressure at a temperature of 165° C. for 8 minutes, followed by a conditioning period of 24 hours at 150° C.

TABLE II

| Amount of oxide based on elastomer | 100% modulus, p.s.i. | Tensile strength, p.s.i. | Elongation, percent | Compression set, percent | Hardness, Shore A |
|---|---|---|---|---|---|
| 1.0% MgO | 350 | 1,550 | 400 | 66.3 | 58 |
| 1.0% BaO | 300 | 1,625 | 300 | 18.7 | 53 |
| 2.0% BaO | 525 | 1,275 | 180 | 16.7 | 61 |
| 3.0% BaO | 800 | 1,400 | 130 | 16.2 | 67 |
| 4.0% BaO | 1,100 | 1,250 | 110 | 15.9 | 71 |
| 5.0% BaO | 1,275 | 1,275 | 110 | 13.9 | 72 |

These results show the greatly improved compression set obtainable when magnesium oxide (at the 1% level) is replaced by an equal amount of weight of barium oxide.

The results also show that increasing the amount of barium oxide above the 1% level has a small effect on the compression set and a large effect on the modulus and hardness of the cured elastomer.

Example 3

A masterbatch was prepared containing 100 parts of 97.5/2.5 ethyl acrylate/vinyl chloroacetate elastomer, 50 parts of FEF (Fast Extruding Furnace) carbon black and 2 parts of stearic acid. The masterbatch was milled with 3.0 parts of diammonium terephthalate, 2.3 parts of dodecyl bromide and 1.9 parts of barium oxide. The elastomer mix was cured in a mold at a temperature of 165° C. for 10 minutes, followed by a conditioning period of 24 hours at 150° C.

TABLE III

Tensile strength, p.s.i. _____ 1675
Elongation, percent _____ 90
Hardness, Shore A _____ 80
Compression set _____ 19.5

Example 4

Four masterbatches were prepared as in Example 1. Each masterbatch was milled with 3.0 parts of ammonium benzoate and the amount of barium compound shown in Table IV. Molar equivalents of the barium compounds were used. The elastomer mixes were cured in molds, under pressure, at a temperature of 165° C. for 8 minutes except for the $BaCl_2$ run which was cured for 12 minutes, followed by a conditioning period of 24 hours at 150° C.

TABLE IV

| No. | Amount based on elastomer | 100% modulus, p.s.i. | Tensile strength, p.s.i. | Elongation, percent | Compression set, percent | Hardness, Shore A |
|---|---|---|---|---|---|---|
| 1 | 3.0% BaO | 850 | 1,575 | 140 | 22.5 | 67 |
| 2 | 4.0% $BaCl_2$ | 250 | 1,625 | 310 | 28.4 | 53 |
| 3 | 5.0% $Ba(OOCCH_3)_2$ | 350 | 1,500 | 220 | 33.1 | 58 |
| 4 | 5.2% $Ba(NO_3)_2$ | 200 | 1,550 | 340 | 32.2 | 52 |

These results show that various barium salts are not equivalent to barium oxide when used in equivalent amounts.

Example 5

Six masterbatches were prepared as in Example 1. Each masterbatch was milled with 3.0 parts of ammonium benzoate and the amount and kind of oxide or hydroxide shown in Table V. The elastomeric mixes were cured in molds under pressure at a temperature of 165° C. for 8 minutes, followed by a conditioning period of 24 hours at 150° C.

TABLE V

| No. | Amount based on elastomer | 100% modulus, p.s.i. | Tensile strength, p.s.i. | Elongation, percent | Hardness Shore A |
|---|---|---|---|---|---|
| 1 | 1.0% MgO | 425 | 1,400 | 310 | 63 |
| 2 | 1.4% Mg(OH)$_2$ | 400 | 1,425 | 310 | 62 |
| 3 | 3.8% BaO | 1,100 | 1,350 | 120 | 71 |
| 4 | 4.2% Ba(OH)$_2$ | 725 | 1,675 | 150 | 64 |
| 5 | 1.4% CaO | 1,100 | 1,450 | 120 | 71 |
| 6 | 1.8% Ca(OH)$_2$ | 775 | 1,550 | 170 | 68 |

These results show that the alkaline-earth metal hydroxides are not equivalent to the alkaline-earth metal oxides when used in equivalent amounts.

I claim:

1. A process of curing a reactive halogen-containing elastomer which comprises intimately mixing 100 parts of said elastomer with from about 1–20 parts by weight of an ammonium salt of a weak acid having a pka value of above about 3 and about 0.1 to 10 parts by weight of an alkaline-earth metal oxide; and heating said mixture above about 150° C. for a time sufficient to cure the elastomer.

2. The process of claim 1 wherein said elastomer is a copolymer comprising, in major proportion, a lower alkyl acrylate and, in minor proportion, vinyl chloroacetate.

3. The process of claim 2 wherein the lower alkyl acrylate is ethyl acrylate.

4. The process of claim 1 wherein the elastomer is a copolymer comprising, in major proportion, ethyl acrylate and, in minor proportion, vinyl chloroethyl ether.

5. The process of claim 1 wherein the elastomer is a polychloroprene.

6. The process of curing a reactive halogen-containing elastomer which comprises intimately mixing 100 parts of said elastomer with from about 1–20 parts by weight of ammonium benzoate and about 0.1 to 10 parts by weight of barium oxide; and heating said mixture above about 150° C. for a time sufficient to cure the elastomer.

7. A process of curing a reactive halogen-containing elastomer which comprises intimately mixing 100 parts of said elastomer with from about 1–20 parts by weight of ammonium terephthalate and about 0.1 to 10 parts by weight of barium oxide; and heating said mixture above about 150° C. for a time sufficient to cure the elastomer.

8. A process of curing a reactive halogen-containing elastomer which comprises intimately mixing 100 parts of said elastomer with from about 0.1 to 10 parts by weight of calcium oxide and about 1 to 20 parts by weight of ammonium benzoate; and heating said mixture above about 150° C. for a time sufficient to cure the elastomer.

9. A process of curing a reactive halogen-containing elastomer which comprises intimately mixing 100 parts of said elastomer with from about 0.1 to 10 parts by weight of calcium oxide and about 1 to 20 parts by weight of ammonium terephthalate; and heating said mixture above about 150° C. for a time sufficient to cure the elastomer.

10. A heat-curable elastomeric composition comprising 100 parts by weight of a reactive halogen-containing elastomer, about 1–20 parts by weight of an ammonium salt of a weak acid having a pka value of above about three, and about 0.1 to 10 parts by weight of an alkaline-earth metal oxide.

References Cited

UNITED STATES PATENTS

| 2,953,550 | 9/1960 | Frostick et al. | 260—86.3 |
| 3,043,814 | 7/1962 | Martin | 260—86.3 |
| 3,055,842 | 9/1962 | Robinson | 252—461 |
| 3,184,415 | 5/1965 | Huntley et al. | 252—461 |
| 3,288,763 | 11/1966 | Waldron | 260—92.3 |

HARRY WONG, JR., *Primary Examiner.*

U.S. Cl. X.R.

252—430; 260—79.3, 80.3, 82.1, 92.3